United States Patent [19]
King

[11] Patent Number: 5,372,243
[45] Date of Patent: Dec. 13, 1994

[54] APPARATUS AND METHOD FOR CLEANING CONVEYORS

[75] Inventor: William J. King, Orange, Calif.

[73] Assignee: Pure-Chem Products Company, Inc., Stanton, Calif.

[21] Appl. No.: 193,237

[22] Filed: Feb. 7, 1994

[51] Int. Cl.$^5$ .............................................. B65G 45/22
[52] U.S. Cl. ................................................... 198/495
[58] Field of Search ................................. 198/495, 500

[56] References Cited
U.S. PATENT DOCUMENTS

| | | | |
|---|---|---|---|
| 4,087,320 | 5/1978 | Danahy et al. | 198/495 X |
| 4,627,457 | 12/1986 | Bird et al. | 198/500 X |
| 4,830,175 | 5/1989 | Durst et al. | 198/495 |
| 4,960,200 | 10/1990 | Pierce | 198/495 |
| 5,031,750 | 7/1991 | Barnes | 198/495 |

*Primary Examiner*—James R. Bidwell
*Attorney, Agent, or Firm*—Willie Krawitz

[57] ABSTRACT

A pneumatically controlled system for cleaning conveyor belts is provided which applies cleaning compounds such as detergents and chemicals to the belts through nozzles positioned between the belts. Following application of the cleaning compounds, a rinse cycle is then applied to remove dirt and residue from the conveyor belts, and the process is repeated at suitable intervals. The belt cleaning process may be carried out during normal production operations or after production hours.

16 Claims, 2 Drawing Sheets

APPARATUS AND METHOD FOR CLEANING CONVEYORS

BACKGROUND OF THE INVENTION

This invention relates to a new and improved apparatus and process for cleaning conveyors using a pneumatically controlled, rather than an electrically controlled, cleaning system; which functions automatically; which reduces the amount of labor to use and service the equipment; and, which reduces the amount of cleaning compound employed in the process.

Conveyors commonly used in the food and packaging industries generally require continual cleaning for maintaining them in a sanitary condition, and this in turn necessitates the periodic application of various types of cleaning ingredients such as detergent, sanitizers such as bactericides, slimicides, etc. A frequent industry practice is to apply these cleaning ingredients to conveyors manually by means of high pressure hot water, and/or steam hoses, or with tank cleaning equipment, or both.

This industry practice is both cumbersome and dangerous and the system does not always adequately clean the underside of the conveyors. In addition, there is a tendency to overuse the cleaning ingredients, and the high pressure process can atomize the detergent and other cleaning ingredients causing exposure of personnel in the food or packaging plant, or these ingredients may be dispersed into the surrounding air, with a resultant exposure of the public.

In addition, electrical equipment used for conveyor components which are exposed to water, water vapor, steam, and/or vaporized cleaning ingredients, etc., may have its function impaired due to rusting, short circuiting, and the like.

It would be desireable to provide a conveyor cleaning system and method which avoids the use of electrical components, reduces the use of cleaning ingredients, provides a more effective cleaning operation, and reduces manpower requirements.

THE INVENTION

According to the invention, a pneumatically controlled system is provided for automatically applying cleaning ingredients to a conveyor, such as through spray nozzles, and over timed intervals, thereby controlling the amount of ingredients being applied to the conveyor.

The pneumatically controlled system and process of this invention comprises applying a batch of cleaning ingredients sequentially to sections of the conveyor, and presetting the application timing for each section so that all the sections of the conveyor line are automatically cleaned in sequence, the cleaning operation then usually being followed by a rinse cycle. The control system then automatically resets, thereby causing the cleaning and rinse cycle sequences to repeat. If desired, these sequences can be initiated either by means of a manual start control, or by a counter circuit in conjunction with the reset, and this provides a more flexible control of the entire process, in terms of application times for the cleaning ingredients and subsequent rinse cycles.

DESCRIPTION OF THE PREFERRED EMBODIMENTS

Figure 1:
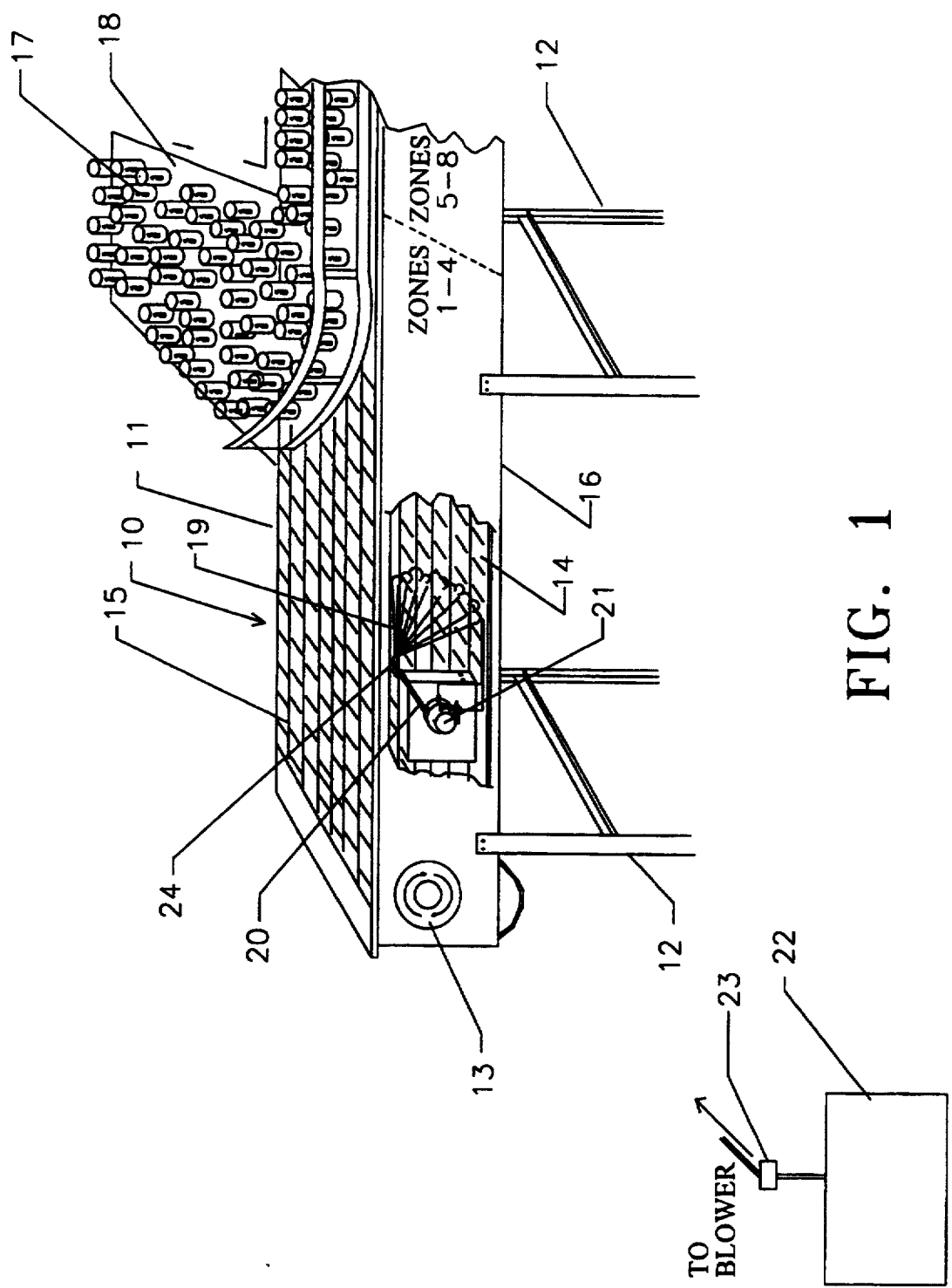
FIG. 1 is a perspective view showing the apparatus of this invention employed in a conveyor system; and, FIG. 2 is a system flow diagram of the invention adapted for control of an entire conveyor line using different washing and rinse cycle times in each zone of the conveyor.

The general arrangement of the apparatus 10 for cleaning and rinsing a conveyor 11 is shown in FIG. 1, the conveyor comprising a conveyor support 12, conveyor belt drive means 13, and a conveyor belt 14 with upper and lower sides 15, 16 respectively, the conveyor belt being shown moving a plurality of cans 17 as they are deposited thereon from a merging feed belt 18.

In a typical embodiment of this invention, the conveyor is divided into arbitrary zones, say zones 1-8. Cleaning ingredients are fed as a spray 19 from a delivery pipe 20 to the lower side 16 of zones 1-4 of the conveyor belt, by means of air pressure supplied through a blower 21, from a supply tank 22 containing suitable cleaning ingredients which are fed by pump 23 to the blower 21. The cleaning ingredients are fed from the delivery pipe 20 to the conveyor through spray nozzles 24 mounted along the sides of the conveyor. In a similar fashion, rinse ingredients are supplied to the conveyor zones 5-8 from a supply tank (not shown). Typically, about 1-30 nozzles per zone may be employed, and can be located adjacent areas which would normally be inaccessible, or where dirt, etc., have a tendency to accumulate, and fifteen zones can easily be treated.

The cleaning ingredients may include detergents, usually in conjunction with hot water and/or steam, followed by a rinse cycle including hot water and/or steam and possibly using slimicides, fungicides, bactericides, etc. In another embodiment of this invention, a bactericide, fungicide, bactericide, etc., may be applied to the conveyor as a foam, and then allowed to dry in place, following a rinse step. The foam may be applied to the conveyor at intermittent times in place of a rinse cycle, in conjunction with a rinse cycle, or included with, or following a cleaning application. If desired, a lubricant may be included with the cleaning ingredients, or in the rinse cycle, or both.

The cleaning and rinsing ingredients are preferably applied in between the conveyor belts, and the applications are carried out with sufficient frequency to reduce build up on the conveyor of dirt, sludge, bacteria, and so forth. Typically, a complete cycle for applying the cleaning and rinsing ingredients may take place in about a 2-10 minute period/hr. during a production run, or less frequently if desired. Alternatively, longer rinsing and cleaning times may be employed if the conveyor is not in use.

Figure 2:
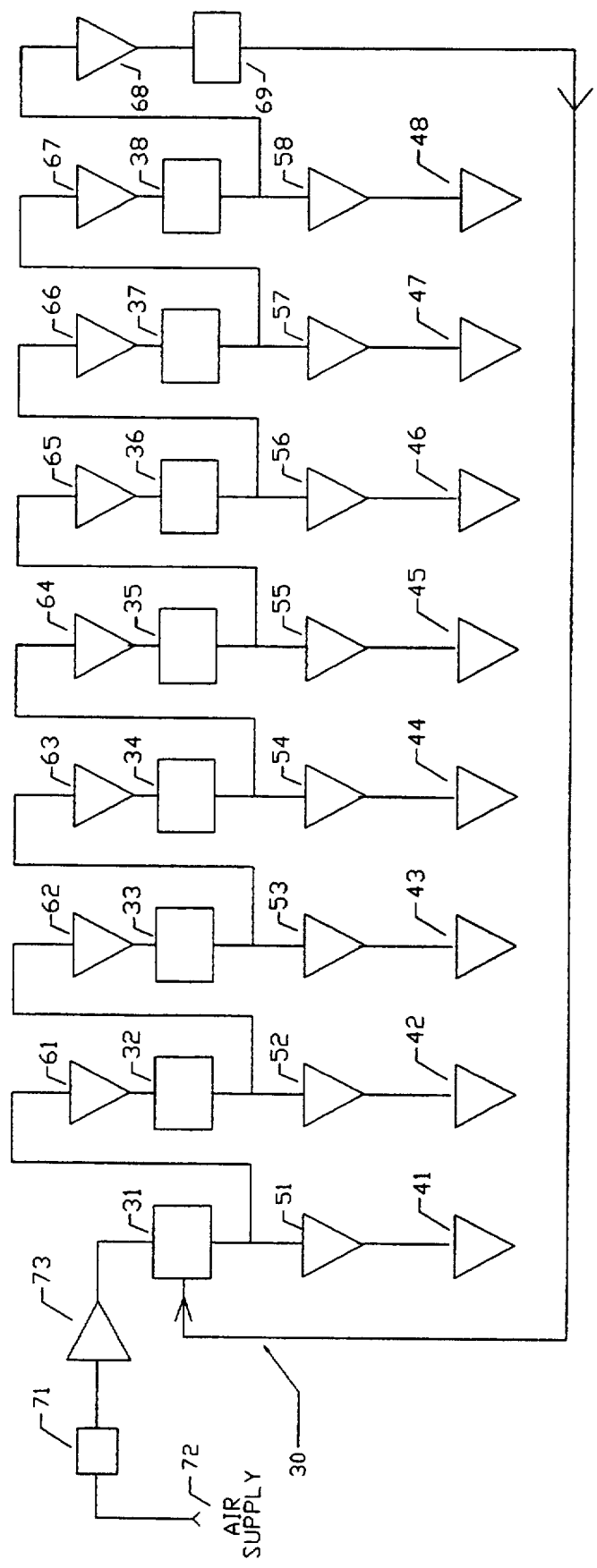

A pneumatically powered system 30 for controlling the timed application of cleaning ingredients to the conveyor 11 and for the rinse cycle is shown in FIG. 2, and includes a plurality of sequence zone valves 31-38 (Clippard R-932 4-way sequence valve) which hold open valves and provide sequencing operations. Conveyor zones 1-4 are sprayed with cleaning ingredients from supply tank 22 connected under pressure to respective, normally closed fluid valves 41-44 and then to the sprayers 24. Pilot valves 51-54 (MAC 900 series, 4-way solenoid) control opening and closing of respective fluid valves 41-44, the pilot valves being controlled by timers 61-64. Zone valves 31-34 will maintain a specific pilot valve and corresponding fluid valve open so that cleaning ingredients can be pressured into pipe 20 by pump 23 and then sprayed through nozzles 24 onto the conveyor 11. Upon the timed completion of cleaning in a zone, a sequence signal is sent from a zone valve to the next timer and the succeeding zone is then cleaned. Similarly, fluid valves 45-48 connecting the rinse supply to nozzles 24, are controlled by respective zone valves 35-38, timers 65-68, and pilot valves 55-58, to enable spraying onto zones 5-8.

In summary, when the set time on a specific timer 61-68 (KOBER Cat. 10-180's) has expired, the corresponding zone valve will shut down that specific zone, and the zone valve exhaust will then sequentially trigger a succeeding timer to commence running. This will turn on a corresponding pilot valve and corresponding fluid valve, to enable the cleaning or rinsing of a specific conveyor zone.

Since each of the conveyor zones 1-8 frequently differ in length, individual zones usually require varying application times for adequate cleaning cycles and rinse cycles. Hence, timers 61-64 which turn the pilot valves 51-54 on and off, are usually individually preset to provide a suitable time for a cleaning procedure in specific conveyor zones 1-4.

Similarly, the rinse cycle timers 65-68 are designed to turn corresponding individual pilot valves 55-58 on and off, at differing time periods in conveyor zones 5-8.

With the system operating in a cleaning and rinse cycle mode, the conveyor first passes through the cleaning zones 1-4, and then through the rinse zones 5-8. The system then resets using a reset signal 69 by timer 68, and the cleaning and rinse cycles are then automatically repeated. If automatically repeating the cleaning and rinse cycles proves undesirable, a manual reset may be used instead of an automatic reset.

An adjustable time counter circuit 71 fed from a compressed air supply 72 feeds air to a 3-way valve 73 (Clippard R-301), thereby powering the zone valves, timers, and pilot valves, and controlling the number of operational resets. When time on the counter circuit 71 runs out, the counter will turn off and turn off the 3-way valve 73; this causes the system to close down. The cleaning and rinse cycles can be restarted by resetting the counter circuit 71 using an included manual start up control.

The counter circuit 71 and timers 51-58 thus provide a pneumatically powered, preset time control for operating the system overall. Also use of the exhaust of zone valves 1-8 to signal a succeeding timer for commencement of spraying onto a succeeding conveyor zone provides a pneumatic time control for commencing the onset and termination of cleaning and rinsing cycles in a particular conveyor zone.

Suitable spray nozzles 24 are described in Applicant's U.S. application Ser. No.: 08/137,632 filed Oct. 15, 1993, entitled: "NOZZLE DEVICE FOR SUPPLYING LUBRICANT TO CONVEYORS"; and Applicant's U.S. Pat. No. 5,033,676 and 5,115,978. Moreover, the present invention may be included along with a system for lubricating conveyors, as described in Applicant's U.S. Pat. No. 5,129,481; and, Applicant's U.S. application Ser. No.: 07/993,613; filed: Dec. 21, 1992, entitled: "APPARATUS AND METHOD FOR LUBRICATING CONVEYORS"

The system of this invention reduces the amount of cleaning and rinse ingredients necessary to maintain a conveyor line in a clean condition. Moreover, the system is inexpensive and easy to install and operate, particularly because it can be remotely controlled, and because it does not require the extensive steam cleaning operations of present day systems.

I claim:

1. A cleaning and rinsing apparatus system for cleaning a conveyor defining a plurality of zones, including first and last zones, comprising:
   a.) a source of cleaning and rinsing ingredients;
   b.) a plurality of normally closed pneumatically actuated fluid valves, a specific fluid valve being adapted to admit cleaning and rinsing ingredients from the source;
   c.) a plurality of spray nozzles, at least one nozzle being connected to a fluid valve in a specific zone of the conveyor;
   d.) pressurization means for feeding the cleaning and rinsing ingredients from the source to the fluid valves;
   e.) a plurality of pneumatically actuated pilot valves, each pilot valve, upon actuation, being adapted to open a corresponding fluid valve and admit cleaning and rinsing ingredients therethrough under pressurization, for application to a specific zone of the conveyor, and to be actuated for closing the fluid valve against the pressurization means;
   f.) a plurality of pneumatically actuated timers, each timer being adapted to actuate a corresponding pilot valve into an open position for actuating the corresponding fluid valve, if the timer is turned on, and to close the corresponding pilot valve when the timer is turned off;
   g.) a plurality of pneumatically actuated sequencer valves, a specific sequencer valve being associated with a specific zone of the conveyor, and being adapted to turn on a succeeding timer in a succeeding zone, when a timer in the same zone as the sequencer is turned off;
   h.) a pneumatically actuated reset timer adapted to provide a reset signal to a timer in the first zone when the last conveyor zone has been cleaned or rinsed, and the reset timer is turned off, thereby turning on the timer in the first zone and restarting a cleaning and rinse cycle;
   i.) a pneumatically actuated, presettable timer means and timer valve means for controlling cleaning and rinse cycle times; and,
   j.) an air supply source for powering the apparatus; whereby, when the presettable timer means is on, it will open the timer valve means and admit air pressure from the air supply source to power the system, and enable a cleaning and rinse cycle to spray the conveyor with cleaning and rinse ingredients, and when time expires on the presettable timer means, it will turn off and close the timer valve means, thereby turning off the cleaning and rinse cycles.

2. The system of claim 1, in which the pneumatically actuated timers and presettable timer means are adjustable.

3. The system of claim 1, in which the cleaning ingredients are selected from the class consisting of detergents, hot water, steam and mixtures thereof.

4. The system of claim 1, in which the rinse ingredients are selected from the class consisting of bactericides, slimicides, fungicides, hot water, steam, and mixtures thereof.

5. The system of claim 1, in which the cleaning or rinse ingredients include a lubricant.

6. The system of claim 1, including 1–30 nozzles per zone.

7. The system of claim 1, comprising 1–30 nozzles and about 1–30 zones.

8. The system of claim 1, including conveyor means adapted for cleaning by the cleaning and rinsing apparatus.

9. A method for cleaning a conveyor by a cleaning and rinsing apparatus system, comprising:
 a.) pressuring cleaning and rinsing ingredients from a supply source through fluid valves, each fluid valve corresponding to a separate zone of the conveyor, and feeding the cleaning and rinsing ingredients through spray nozzles onto a corresponding zone of the conveyor;
 b.) controlling opening a fluid valve with a corresponding pilot valves, thereby admitting cleaning and rinsing ingredients therethrough under pressurization, for application to a specific zone of the conveyor, and for closing the fluid valve against pressurization from the supply source;
 c.) opening a pilot valve in a specific zone of the conveyor with a corresponding, pneumatically actuated timer, when a timer is turned on, and closing the corresponding pilot valve when the timer is turned off;
 d.) turning on a timer in a specific zone of the conveyor with a pneumatically actuate sequencer valve in a preceding zone, when a timer in the same zone s the sequencer is turned off;
 e.) pneumatically providing a reset signal from a timer in a last zone of the conveyor to a timer in a first zone of the conveyor when the last zone of the conveyor has been cleaned and rinsed, thereby restarting a cleaning and rinse cycle;
 f.) pneumatically controlling the cleaning and rinse cycle times with a pneumatically actuated, presettable timer means and timer valve means which are actuable from an air supply source for powering the apparatus; whereby, when the presettable timer means is on, it will open the timer valve means and admit air pressure from the air supply source to power the system, and enable a cleaning and rinse cycle to spray the conveyor with cleaning and rinse ingredients, and when time expires on the presettable timer means, in will turn off and close the timer valve means, thereby turning off the cleaning and rinse cycles.

10. The method of claim 9, in which the pneumatically actuated timers and presettable timer means are adjustable.

11. The method of claim 9, in which the cleaning ingredients are selected form the class consisting of detergents, hot water, steam and mixtures thereof.

12. The method of claim 9, in which the rinse ingredients are selected from the class consisting of bactericides, slimicides, fungicides, hot water, steam, and mixtures thereof.

13. The method of claim 9, in which the cleaning or rinse ingredients include a lubricant.

14. The method of claim 9, comprising 1–10 nozzles per zone.

15. The method of claim 9, comprising 1–30 nozzles and about 1–30 zones.

16. The method of claim 9, comprising conveyor means adapted for cleaning by the cleaning and rinsing apparatus.

* * * * *